United States Patent
Kim et al.

(10) Patent No.: US 11,879,736 B2
(45) Date of Patent: Jan. 23, 2024

(54) NAVIGATION INTEGRITY IN GPS CHALLENGED ENVIRONMENTS

(71) Applicant: Raytheon Company, Tewksbury, MA (US)

(72) Inventors: Taehwan Kim, Culver City, CA (US); Kenneth L Moore, Marina Del Rey, CA (US); James T. Landon, Marana, AZ (US); Jarrett M. Perry, Manhattan Beach, CA (US); Benjamin J. Graham, Redondo Beach, CA (US)

(73) Assignee: Raytheon Company, Tewksbury, MA (US)

( * ) Notice: Subject to any disclaimer, the term of this patent is extended or adjusted under 35 U.S.C. 154(b) by 275 days.

(21) Appl. No.: 17/018,846

(22) Filed: Sep. 11, 2020

(65) Prior Publication Data
US 2023/0392929 A1     Dec. 7, 2023

(51) Int. Cl.
*G01C 21/00*     (2006.01)

(52) U.S. Cl.
CPC ................... *G01C 21/005* (2013.01)

(58) Field of Classification Search
CPC .... G01C 21/005; G01C 21/165; G01C 21/16; G01D 21/00; G01D 18/00; G01R 23/165; G01S 13/589; G01S 7/40; G01S 7/497; G06F 11/008
See application file for complete search history.

(56) References Cited

U.S. PATENT DOCUMENTS

| | | | | |
|---|---|---|---|---|
| 5,313,212 | A * | 5/1994 | Ruzicka | H03H 17/0257 |
| | | | | 342/195 |
| 10,353,764 | B1 * | 7/2019 | Cazzanti | G06F 11/0793 |
| 2006/0074558 | A1 * | 4/2006 | Williamson | G01S 19/15 |
| | | | | 342/357.56 |
| 2009/0048779 | A1 * | 2/2009 | Zeng | G01C 21/165 |
| | | | | 701/511 |
| 2013/0035855 | A1 * | 2/2013 | Natroshvili | G01S 19/393 |
| | | | | 701/480 |

FOREIGN PATENT DOCUMENTS

KR         101529515        *  6/2015    ............. G01R 31/36

OTHER PUBLICATIONS

Translation of 101529515B1 (Year: 2015).*

* cited by examiner

*Primary Examiner* — Kenneth J Malkowski
*Assistant Examiner* — Carville Albert Hollingsworth, IV
(74) *Attorney, Agent, or Firm* — Schwegman Lundberg & Woessner, P.A.

(57) ABSTRACT

Systems and methods for detecting degraded navigation sensors are based on a policy derived from a Partially Observable Markoff Decision Process (POMDP). Navigation parameters derived from the navigation sensors are provided to individual Kalman filters. A covariance of each of the filters is indicative of a probability of degradation of a sensor from which the navigation parameter is derived. Outputs of the Kalman filters are provided to a master filter. The master filter is compared to a criterion to determine whether there are indicia of a degraded sensor. If such an indicia are present, the Policy is consulted to determine which of the sensors are degraded. Consideration of degraded sensors when navigating a vehicle is inhibited.

17 Claims, 8 Drawing Sheets

NAVIGATION INTEGRITY IN GPS CHALLENGED ENVIRONMENTS

BACKGROUND

In a GPS-denied "Alternative Position, Navigation, and Time (PNT)" environment, a technological gap exists in assuring sensor fusion integrity that mitigates multiple faults, including intentional jamming and spoofing. Empirical discovery of an un-spoofed and optimal fusion solution is possible by exhaustive combinatorial sensor removal and replacement testing. However, as the number of signals-of-opportunity and on-board sensors could be four times more than the visible GPS satellites, the combinatorial testing of n sensors requiring $2^n$ trials in near real-time is not feasible. Thus, improved methods of identifying degraded navigational sensors are needed.

BRIEF DESCRIPTION OF THE DRAWINGS

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

DETAILED DESCRIPTION

Figure 1:
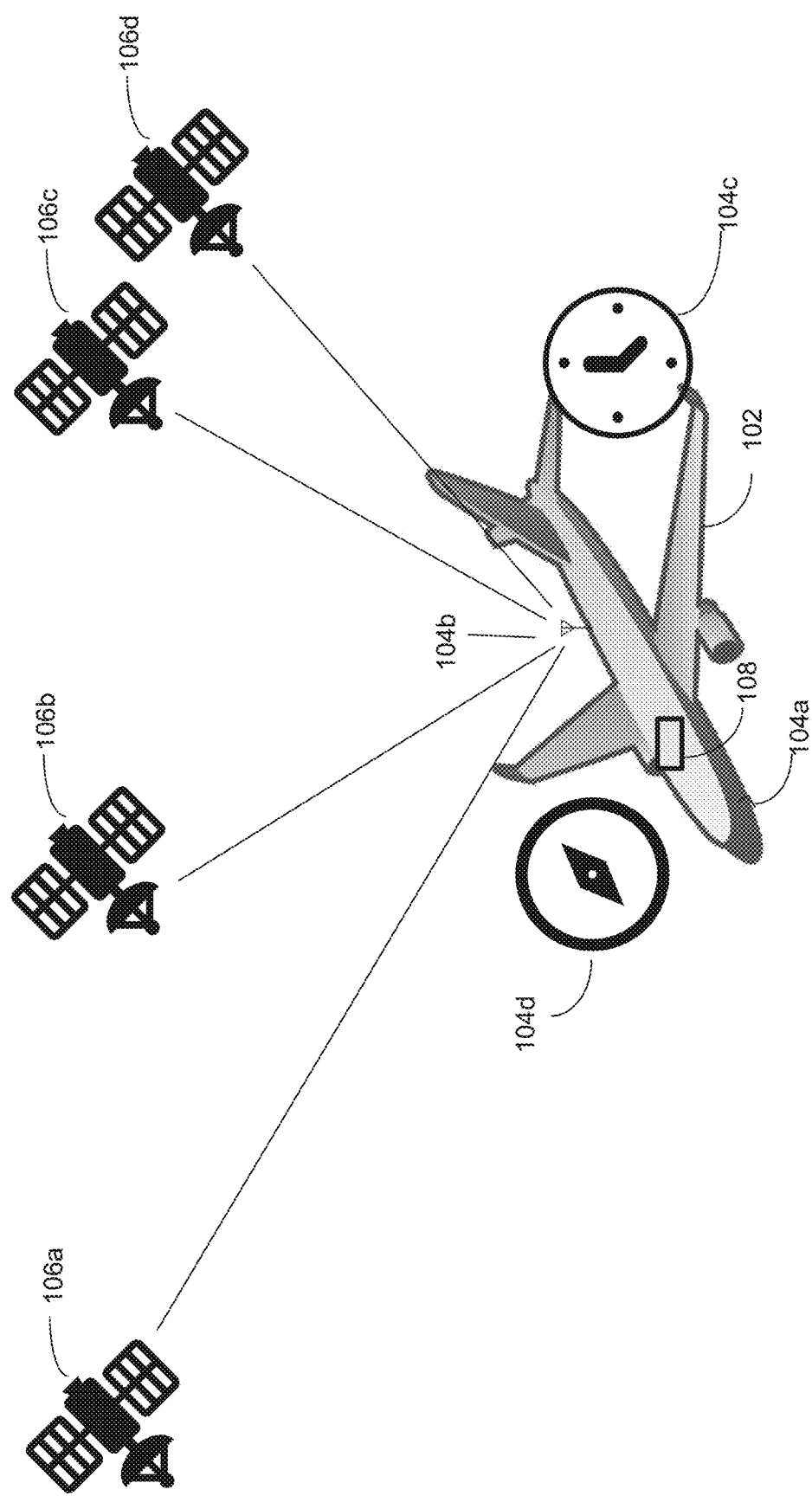
FIG. 1 is an overview diagram of a navigation system implemented in one or more of the disclosed embodiments.

The present disclosure is generally directed to a partially observable Markov decision process (POMDP) for near real-time autonomous integrity monitoring of a sensor fusion algorithm. This process is equivalent, in at least some environments, to results of empirical combinatorial sensor subset removal/replacement testing. A Markov Decision Process (MDP) is an iterative algorithm that results in a decision at each stage of iteration with respect to a model of the environment within which the process acts. The MDP acts as an agent that computes at any stage the maximum benefit decision with minimum cost upon transitioning from any state of an environment to a future state. Generally, a Markov property of an MDP is that future transition decisions depend on the present state, and not on a preceding sequence of state transitions. At any stage of execution, an MDP is certain of a present state because the environment is observable. If, however, the environment is only partially observable, for example, due to lack of awareness, noise, confusion, deception, etc., then the state at any stage of execution is uncertain. A POMDP model is designed to operate under such conditions.

State uncertainty can be represented by a probability of being in a state. A distribution of probability over all states of an environment is a variable known as a belief state or simply "belief." As such, belief is a vector of dimension equal to the number of states, with component probabilities that add, in at least some embodiments, to one (1). Absent certainty of state, expected observables, e.g. measurements, of the environment contribute to the POMDP at each iterative stage to make the best decision upon transitioning state.

In some of the disclosed embodiments, a POMDP iterative computation results in a policy for making an optimal decision for any belief. Decision optimality is based on a model of probable state transition, probable observables upon transitioning to a state, and rewards. Rewards are the immediate payoff or cost for making a decision in a state. In some embodiments, a POMDP rewards a decision that one of the navigation sensors, if any, are a primary source of degraded navigation. The POMDP is formulated and solved offline with a model. The model consists of states, $\mathcal{S}$ actions (decisions), $\mathcal{A}$, rewards, $\mathcal{R}$, Observables, $\mathcal{Z}$, state Transition Probabilities, $\mathcal{T}$, and Observation (emission) probabilities, $\mathcal{O}$. Formally, a POMDP is a tuple, $\langle \mathcal{S}, \mathcal{A}, \mathcal{R}, \mathcal{Z}, \mathcal{T}, \mathcal{O} \rangle$. In this embodiment, each state is an navigation sensor's degree of degradation or the Master Filter's performance acceptability. Actions are removal of a sensor or reliance on all of the sensors considered by the model. A numerical reward is specified for each state/action pair. The rewards are assigned positive for removing a sensor when degraded, negative for its removal if not degraded. State transition probabilities are specified for each action taken. In some embodiments, a degraded sensor will remain degraded unless removed. Thus, a state can either transition into itself, or the state of acceptable Master Filter performance.

In some embodiments, observation probabilities are a likelihood of an observable's occurrence upon taking an action that results in a state. In these embodiments, observables are the navigation parameters' Kalman filter covariance. As such, observable probabilities are specified to be the likelihood that a navigation parameter's covariance diverges from that predicted upon the removal of a particular sensor.

In some embodiments, the POMDP is solved offline. In some embodiments, a dynamic program iteratively executes a Bellman equation including the model parameters. At each stage of the iteration, the algorithm derives the expected value for a given belief. The maximum expected value among all actions (sensor removal decisions) at any stage determines the best risk/reward (cost/benefit) action for transitioning from any state to another in the next stage of the process. When the expected value of the given belief between successive stages minimally changes, the process has reached equilibrium and is terminated.

At each stage of the POMDP, the expected value is computed by the dot product of the given belief vector with a process vector. The process vector is formulated from the POMDP model stochastics and the maximum expected value among process vectors from an observables-dependent finite belief set. In some embodiments, the latter are viewed as strategies for optimizing action taken in transitioning to the next step of the POMDP. Each process vector is uniquely associated with an action. The maximum dot product among all process vectors with the given belief yields the vector associated with the optimal action for that belief. The POMDP accumulates at each stage the vectors associated with optimal actions for any state transition. The resulting set of vectors at POMDP termination constitute an optimal POMDP Policy. In this embodiment, the Policy is realized as a matrix consisting of the resulting vectors. Although formulated for a given belief, any belief may be multiplied by the Policy to determine the action expected to produce the optimal outcome for that belief. The maximum component of the Policy matrix product with any belief vector corresponds to the matrix row associated with the optimal action for that belief. The POMDP Policy matrix may be used online to return real time decisions, optimal with respect to the model, for any belief state.

The information states for POMDP decisions include, in at least some embodiments, the master filter and each separate navigation sensors' performance expressed as a probability of degradation. Specifically, the states are acceptable master filter performance, (e.g. no degradation), and each navigation sensor's probability of degradation.

In some embodiments, when a master filter covariance exceeds a predefined threshold, calculation of an information state is performed. The calculation uses each decentralized navigation parameter's filter (e.g. Kalman filter) covariance. Each navigation parameter, such as position, velocity, time, attitude and heading, is derived from the contributing navigation sensor measurements. Some of the disclosed embodiments use probabilistic fault analysis that is based on a navigation parameter's covariance to determine a probability of each contributing sensor degrading that navigation parameter. Accumulating at any time the master filter and navigation sensor degradation probabilities for each navigation parameter then normalizing the probabilities by their sum produces a distribution of degradation probability over the information states. At any time the calculated distribution constitutes the belief state with which the POMDP policy decides the sensor or sensor combination that is most likely degraded. Some of the disclosed embodiments define the POMDP model observables to be the navigation parameters. The observation (aka emission) probabilities are then formulated causally to reflect the effect of each navigation sensor's degradation on a navigation parameter.

The POMDP Policy acts on any belief state at any time to decide which sensor or combination of sensors is most likely the source of degraded navigation.

The POMDP can be computationally complex and is thus solved offline in some embodiments. Experiments shows the POMDP can be solved in approximately one minute using a POMDP Builder toolkit.

In some embodiments, solving the POMDP results in a policy that is a matrix. The matrix can be used to transform a belief into a vector. In these embodiments, each matrix row is associated with a POMDP decision. As such, each entry of the resultant vector is associated with a decision. The maximum vector component designates the optimal (e.g., Greedy) decision for any given belief. In some embodiments, the POMDP policy matrix is stored via relatively small memory requirements. The matrix multiplication that transforms belief to a decision vector, followed by a threshold operation to determine the maximal component provides the basis of estimating throughput requirements on a bandwidth limited computer.

FIG. 1 is an overview diagram of a navigation system implemented in one or more of the disclosed embodiments. FIG. 1 shows an airplane 102. The airplane is equipped with a plurality of navigation sensors. These sensors include a velocity sensor 104a, a positioning sensor 104b, a time sensor 104c, and a heading sensor 104d. The positioning sensor 104b is illustrated as a Global Navigation Satellite System (GNSS) receiver sensor, which utilizes one or more satellites 106a-d (e.g. four satellites) to determine a 3-D position and time of the airplane 102. Some embodiments include a different combination of navigation sensors. While FIG. 1 illustrates an airplane 102, other embodiments utilize a different type of vehicle, such as a missile, drone, or other vehicle.

FIG. 1 also shows a navigation computer 108. The navigation computer 108 receives input from the on-board navigation sensors 104a-d, and determines a navigation solution for the airplane 102. In at least some embodiments, the navigation computer 108 implements a partially observable Markov decision process (POMDP) to determine if any of the navigation sensors 104a-d and GNSS satellites are degraded. Under some conditions, the navigation computer 108 selectively disregards inputs from one or more of the navigation sensors 104a-d or any of GNSS satellites based on output of the POMDP Policy.

Figure 2:
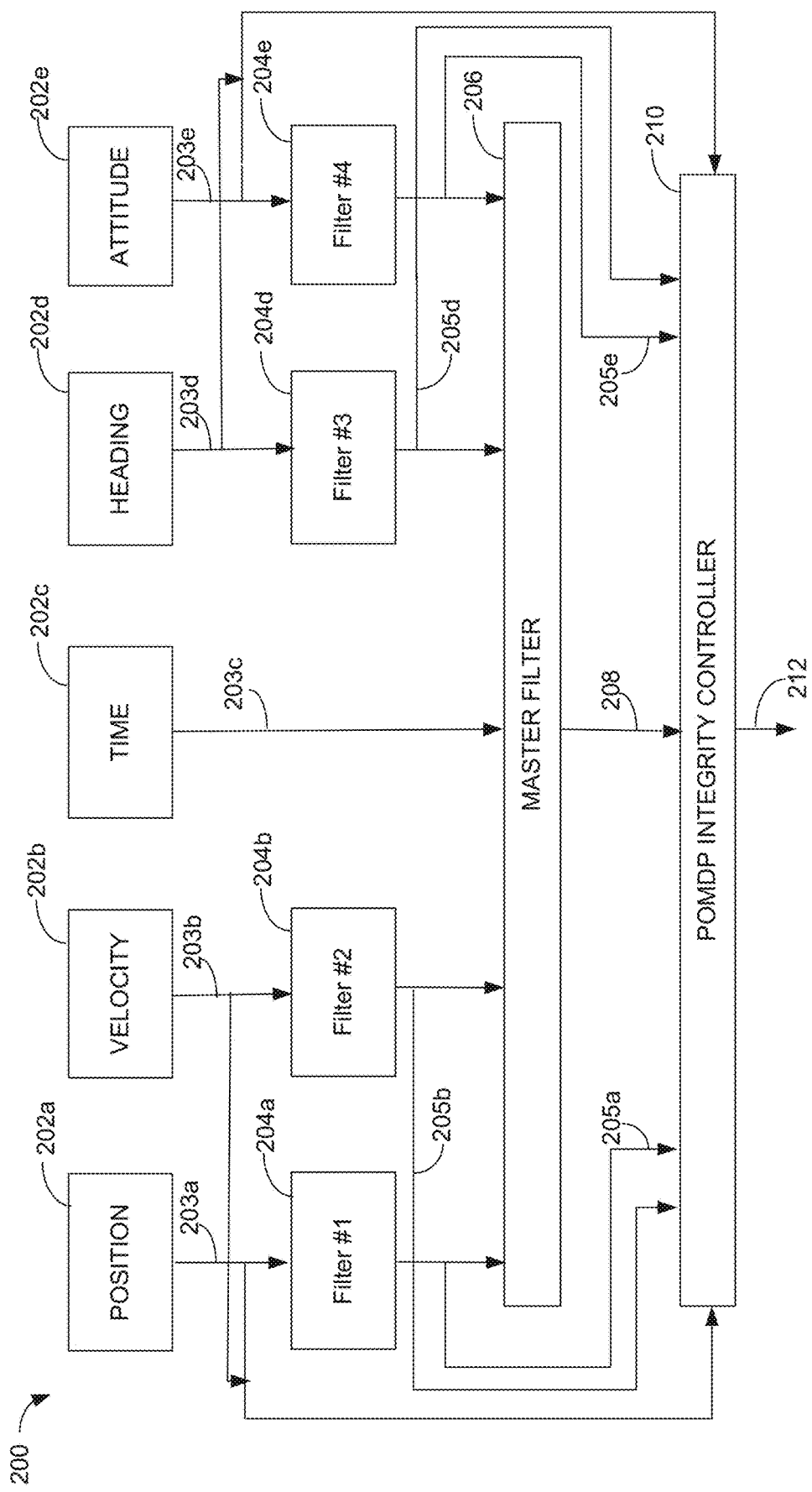
FIG. 2 is a block diagram showing a technical architecture implemented within a navigation computer in one or more of the disclosed embodiments.

FIG. 2 is a block diagram showing a technical architecture 200 implemented within the navigation computer 108 in one or more of the disclosed embodiments. FIG. 2 shows a plurality of navigation sensor's functional categories or navigation parameters (Position, Velocity, Time, Heading, Attitude) in 202a-e that are separately estimated from some combination of available on-board multiple sensors. Navigation Parameters (NP) are separately estimated from measurements from any combination of GNSS receiver, Satellite Communication (SatCom) receiver, two-way data link receiver, RF Signals of Opportunity, Electro Optical and Infrared (EO/IR) imaging systems, terrain mapping radars, Star Tracker, and on-board sensors such as speedometer, barometer, altimeter, magnetometer, Inertial Measurement System (IMU), etc., that are dependent on airplane, missile, or vehicle's equipage. As in GNSS receiver with a single antenna that provides at least Position, Velocity, and Time NP, some physical sensors could provide more than one NP. As in barometer or altimeter, some physical sensors could provide only one part of NP, i.e., the altitude within Position NP. Each NP 203a-e is estimated by navigation Filters 204a-204e or in some embodiment by partitioning of a single navigation Filter. In some embodiments, these navigation parameters are generated by filters, shown in FIG. 2 as filters 204a-e. In some embodiments, one or more of the filters 204a-e are Decentralized Kalman filters (DKF). FIG. 2 shows that each of the filters 204a-e generate corresponding output signal vectors and covariance matrices 205a-e. The outputs 205a-e of the filters 204a-e are provided to a master filter 206. In some embodiments, the master filter is a Kalman filter that combines and scales DKF signal vectors and covariances.

FIG. 2 shows that the navigation parameters 203a-e, outputs 205a-e of the filters 204a-e, and an output of the master filter 208 are provided to an integrity controller 210. In some embodiments, the integrity controller 210 implements a Partially Observable Markov Decision Process (POMDP) Policy. The integrity controller 210 receives this data and generates a Policy indicator 212. The Policy indicator 212 indicates which of the navigation parameter 202a-e are degraded. This information is then used, as discussed above, to control a machine, such as an airplane, missile, or other autonomous device.

Figure 3:
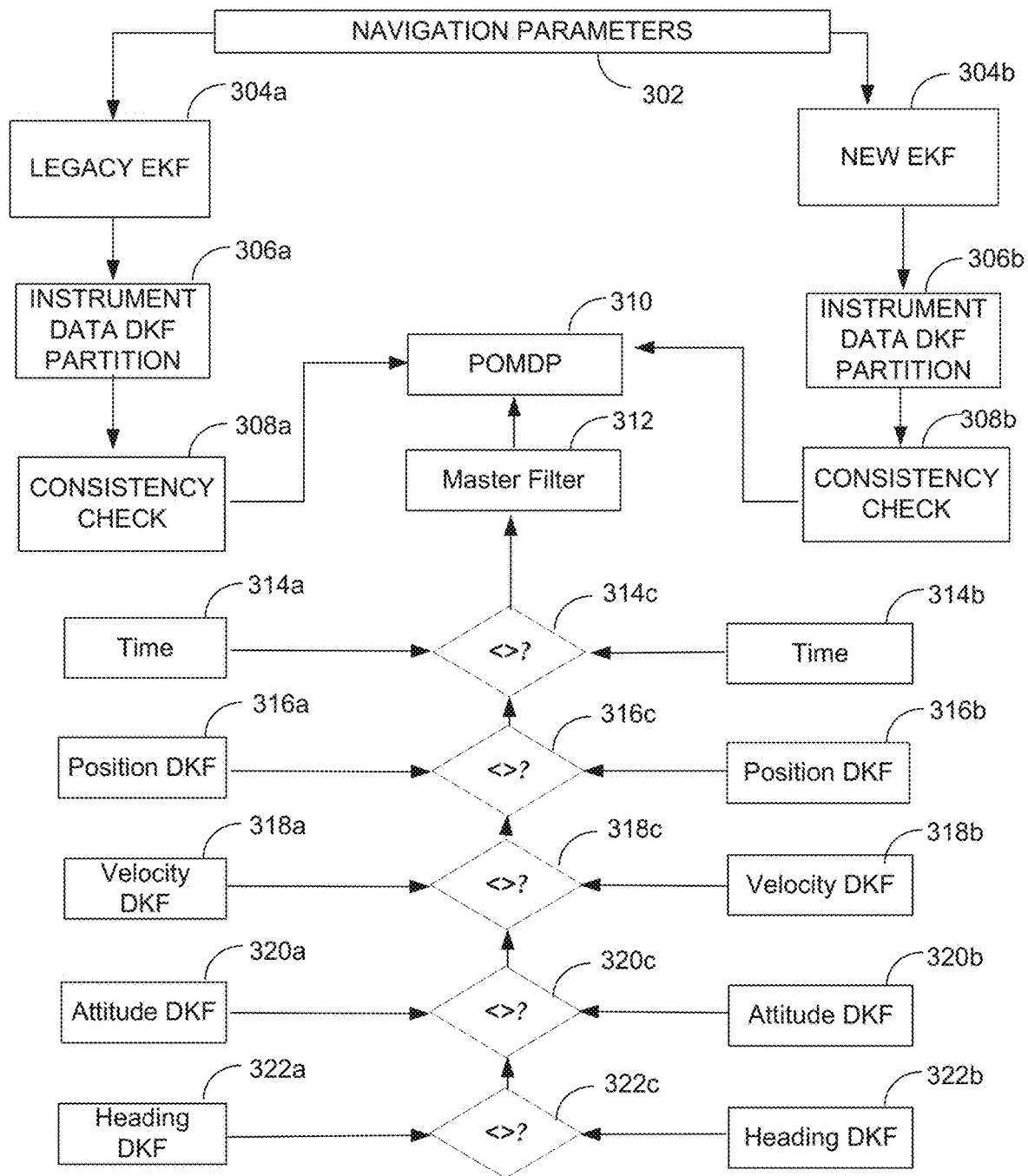
FIG. 3 is a block diagram of an architecture implemented by one or more embodiments of the navigation computer.

FIG. 3 is a block diagram of an architecture implemented by one or more embodiments of the navigation computer 108. FIG. 3 shows navigation parameters, analogous to navigation parameters 203a-e of FIG. 2. The GPS and non-GPS navigation measurements 302 are provided to two Extended Kalman filters (EKF) 304a-b, where the legacy EKF 304a processes US GPS with on-board sensors including IMU while New EKF processes non-GPS navigation signal sources such as international GNSS, SatCom, EO/IR sensor imaging for terrain matching, on-board sensors including IMU and any new RF Signal of Opportunity or Sensor of Opportunity to provide redundancy in GPS-challenged navigation. Output of the two Kalman filters 304a-b is provided to two corresponding Decentralized Kalman filters (DKF) 306a-b. A consistent check process 308a-b is applied to each of the outputs of DKF 306a-b. Results of the consistency check processes 308a-b are supplied to a model 310. In some embodiments, consistency checks from two DKF are supplied to the Master Filter 312.

FIG. 3 also shows two sets of parallel filters. Outputs of a first set of filters 314a, 316a, 318a, 320a, and 322a are compared against a second set of filters 314b, 316b, 318b, 320b, and 322b, by comparators 314c, 316c, 318c, 320c, and 322c. Results of these comparators are provided to a master filter 312, with an output of the master filter 312 provided to the model 310. As discussed above, in some embodiments, the model 310 determines whether one or more sensors that contributed to the navigation parameters 302 are degraded. Some embodiments selectively ignore degraded navigation sensors.

Figure 4:
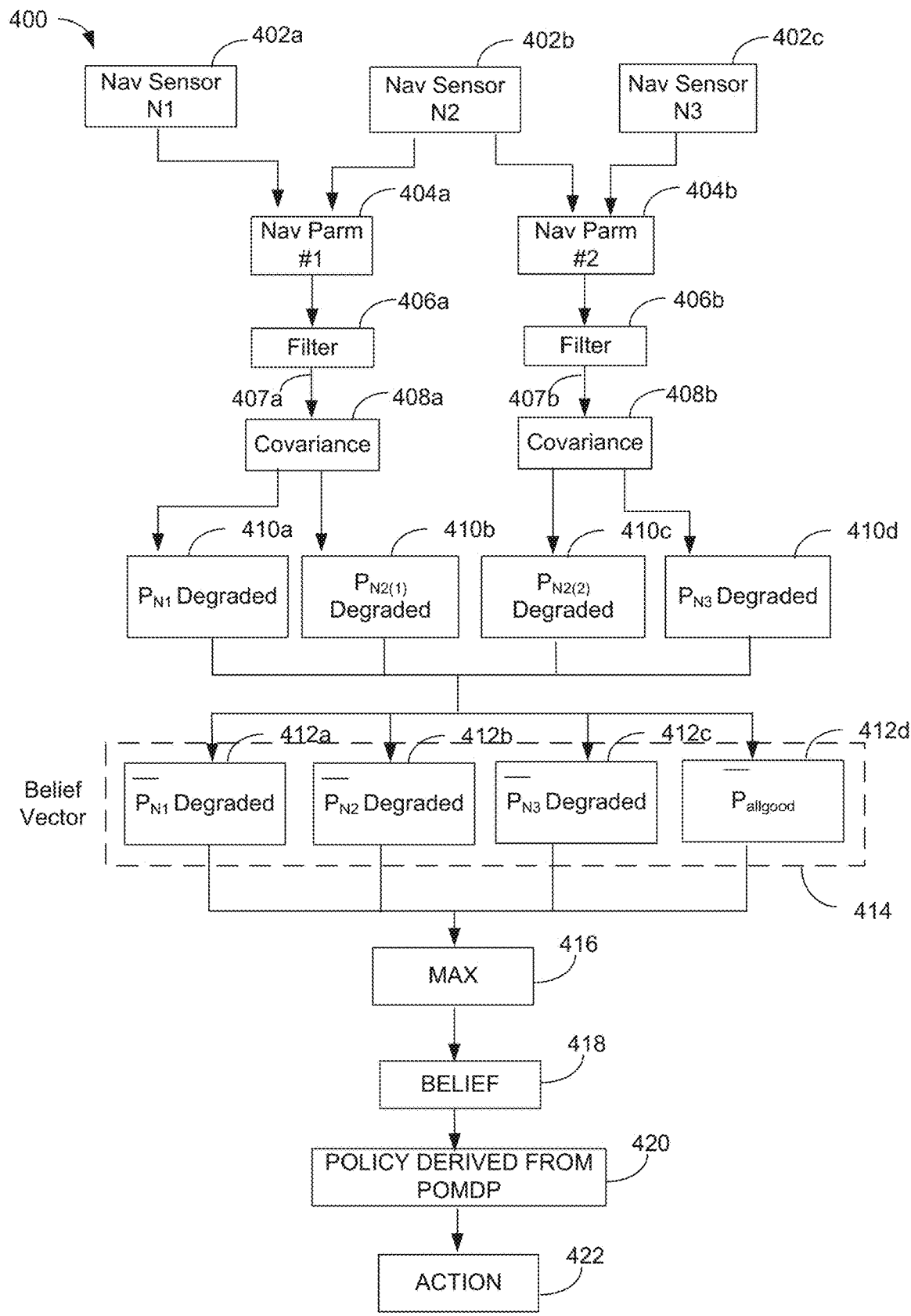
FIG. 4 shows a data flow implemented in one or more of the disclosed embodiments.

FIG. 4 shows a data flow implemented in one or more of the disclosed embodiments. FIG. 4 shows a plurality of navigation sensors 402a-c. FIG. 4 also shows a first navigation parameter 404a. The first navigation parameter 404a is derived from one or more measurements from the navigation sensor 402a and the navigation sensor 402b. The second navigation parameter 404b is derived from one or more measurements of each of the navigation sensor 402b and the navigation sensor 402c.

The data flow 400 includes two filters, filter 406a and filter 406b. In some embodiments one or more of the filters 406a or 406b is a Kalman filter. Each of the navigation parameters 404a and 404b is provided to a respective one of the filters 406a and 406b.

The data flow 400 illustrates that a covariance or covariance (matrix) 408a is generated from an output 407a of the filter 406a. A covariance or covariance (matrix) 408b is generated from an output 407b of the filter 406b.

The data flow 400 illustrates a probability of whether each of the navigation sensors 402a-c is degraded is generated from the covariance (matrices) 408a-b. Since the navigation parameter 404a is derived from data from two navigation sensors 402a and 402b, a covariance resulting from the navigation parameter 404a is used to derive separate probabilities 410a and 410b that each of the navigation sensors 402a and 402b respectively is degraded.

As the navigation sensor 402b is used to derive both navigation parameter values 404a and 404b, covariances derived from those navigation parameter values, covariances 408a and 408b, are used to derive separate probabilities that the navigation sensor 402b is degraded. These separate probabilities are shown as 410b and 410c. The data flow 400 illustrates a probability 410d that navigation sensor 402c is degraded. The probability 410d is generated based on the covariance 408b. The covariance 408b is derived from the navigation parameter 404b, which is derived from measurements from the navigation sensor 402c.

Data flow 400 also includes a belief vector 414. The belief vector 414 is comprised of a plurality of normalized probabilities, shown as probabilities 412a-d. Note that the probability that sensor 402b is degraded is derived from two probability determinations, those of 410b and 410c, such as demonstrated by Equation 1 below:

$$P_{n2}\text{ degraded} = P_{n2(1)} + P_{n2(2)},\quad (1)$$

where:
$P_{n2(1)}$—a probability that nav sensor 402b is degraded as derived from behavior of navigation parameter #1 404a, $P_{n2(2)}$—a probability that navigation sensor 402b is degraded as derived from behavior of navigation parameter #2 404b.

In some embodiments, each of the probabilities is normalized by a sum of the probabilities 410a-d. These normalized values are illustrated via elements of the belief vector 414 as 412a-d in FIG. 4. In some embodiments, a normalized probability is determined according to Equation 2 below:

$$\overline{P_{n1}} = P_{n1}/(P_{n1}+P_{n2}+P_{n2}+P_{n3}+P_{all\ good})\quad (2)$$

where:
$\overline{P_{n1}}$ is the normalized probability,
$P_{n1}\ldots P_{n\#}$ are unnormalized probabilities of degradation, and
$P_{all\ good}$ is a probability that no sensor is degraded.

In Equation 2 above, the belief vector also includes a probability that no sensors are degraded, represented as $P_{all\ good}$. In some embodiments, this probability is determined according to the Equation 3 below:

$$P_{allgood}=(1-P_{n1})*(1-P_{n2\ degraded})*(1-P_{n3\ degraded})\quad (3)$$

The belief vector 414 is provided to a maximum function 416, which identifies a maximum normalized probability included in the belief vector 414. The maximum probability identified by the maximum function 416 forms a belief 418. The belief is mapped, via a Policy 420, to an action 422. The Policy 420 is generated by solving a POMDP, as discussed below, for example, with respect to FIG. 5. The action 422 indicates which, if any, of the navigation sensors 402a-c is degraded. Some embodiments inhibit consideration of a degraded navigation sensor when navigating a vehicle, such an aircraft, missile, or other vehicle.

Figure 5:
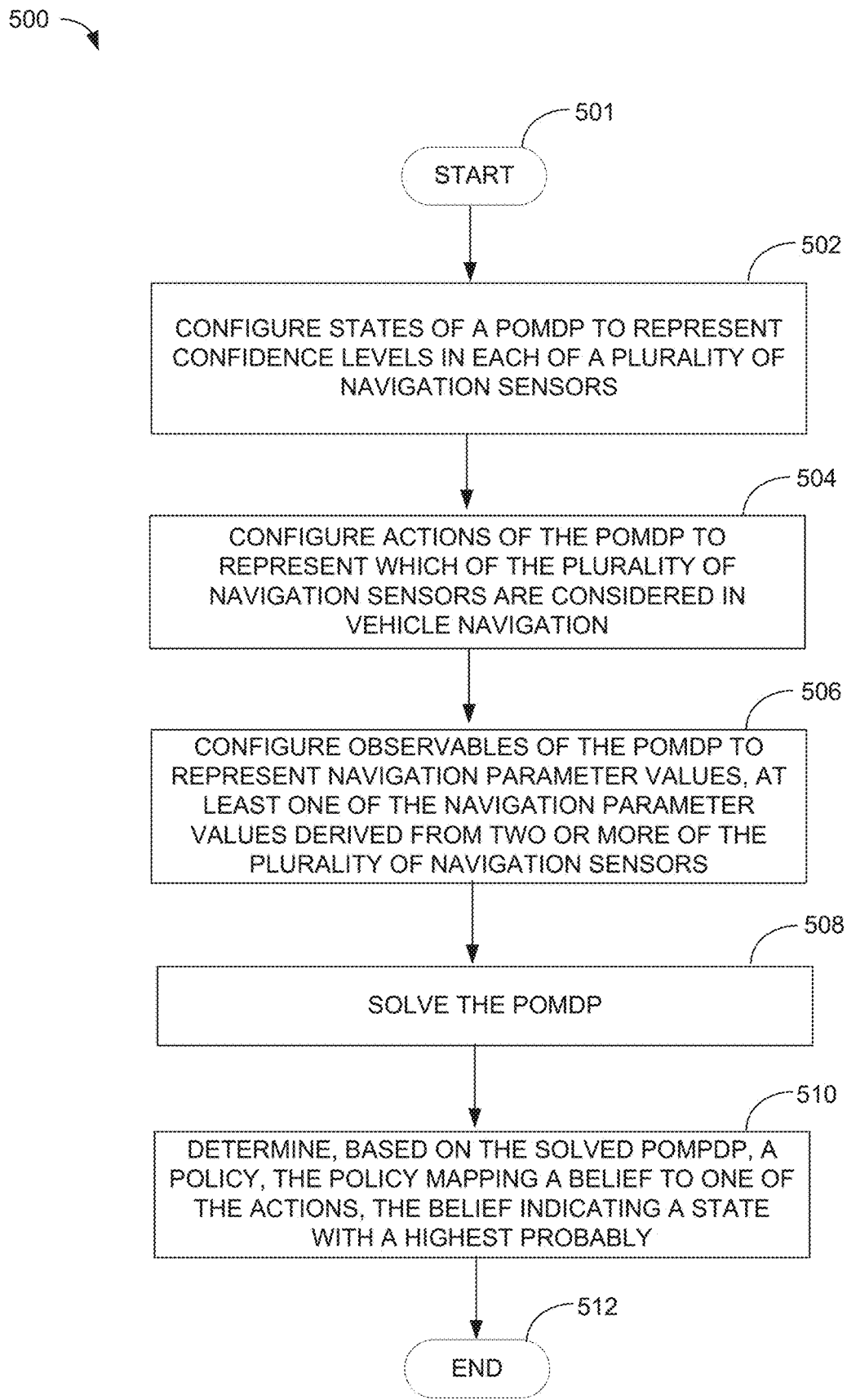
FIG. 5 is a flowchart of an example method that is implemented in one or more of the disclosed embodiments.

FIG. 5 is a flowchart of an example method that is implemented in one or more of the disclosed embodiments. In some embodiments, one or more of the functions discussed below with respect to FIG. 5 are performed by hardware processing circuitry (e.g. processor 802, discussed below. In some embodiments, instructions (e.g. instructions 824 discussed below) stored in a memory (e.g. memory 804 and/or 806 discussed below) configure the hardware processing circuitry to perform one or more of the functions discussed below. In some embodiments, the method 500 is performed by the navigation computer 108.

After start operation 501, method 500 moves to operation 502, where states of a POMDP are configured to represent confidence levels in each of a plurality of navigation sensors. In some embodiments, the navigation sensors include one or more of a master filter state (e.g. $s_1$), a signal of opportunity (SOP) (e.g. Starlink) (e.g. $s_2$), a Military GPS User Equipment (MGUE) (e.g. $s_3$), an International non-encrypted GPS (FAA) (e.g. sa), an Inertial Measurement Unit (IMU) (e.g. $s_5$), a Magnetometer NAV aid (MAN) (e.g. $s_6$), an air data system (ADS) (e.g. $s_7$), or an altimeter Nav Aid (AAN) (e.g. $s_8$). Each of the sensors (e.g. s1 . . . s8 as examples above) can be in one of a plurality of operable states. Thus, for example, each sensor $s_1 \ldots s_n$, has a sensor state, denoted as s', which is represented by, in some embodiments:

s'₁=acceptable, s'₂ ... s'ₘ=a level of degradation, where 1<m<8 in some embodiments.

In operation 504, actions of a POMDP are configured to represent which of the plurality of navigation sensors are considered when navigating a vehicle. For example, the actions include, in some embodiments, a decision to exclude one or more of the navigation sensors from a process that navigates a vehicle. Thus, for example, if a particular navigation sensor is determined to be degraded, an action is to exclude that sensor, or navigation parameters derived from that sensor, from use in navigating a vehicle.

In operation 506, observables of the POMDP are configured to represent navigation parameter values. Each of the navigation parameter values is based on at least one of the plurality of navigation sensors. At least one of the navigation parameter values is based on two or more of the plurality of navigation sensors.

In operation 508, the POMDP is solved. The POMDP is solved based on the configured states, actions, rewards, and observables discussed above. Some embodiments utilize pomdp-solve software to solve the POMDP. At the time of filing, an example utility is available at http://https://cran.r-project.org/web/packages/pomdp/index.html.

In operation 510, a policy is determined based on the solved POMDP. The Policy maps a belief to one of the actions defined by operation 504. Thus, the Policy determines which of the plurality of navigation sensors is most likely a source of degraded navigation. The belief indicates an information state (as defined by the states of operation 502) having a distribution of probability. In some embodiments, the Policy is a matrix that transforms the belief into a vector. Each matrix row is associated with a POMDP decision. Thus, each entry of the resultant vector is associated with a decision in some embodiments. In some embodiments, a maximum vector component designates an optimal decision for the belief.

After operation 510 completes, method 500 moves to end operation 512.

Figure 6:
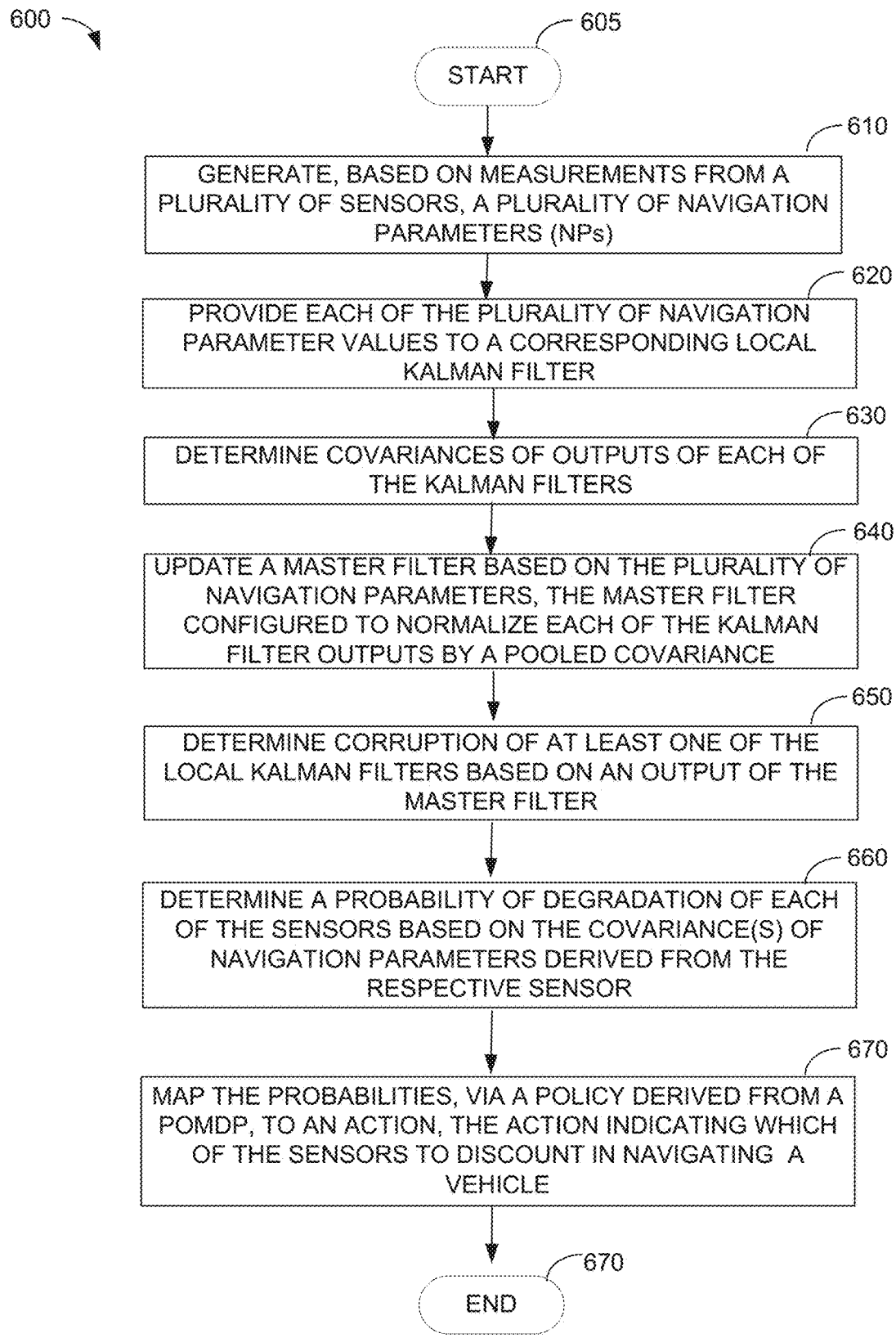
FIG. 6 is a flowchart of an example method that is implemented in one or more of the disclosed embodiments.

FIG. 6 is a flowchart of an example method that is implemented in one or more of the disclosed embodiments. In some embodiments, one or more of the functions discussed below with respect to FIG. 6 are performed by hardware processing circuitry (e.g. processor 802, discussed below. In some embodiments instructions (e.g. instructions 824 discussed below) stored in a memory (e.g. memory 804 and/or 806 discussed below) configure the hardware processing circuitry to perform one or more of the functions discussed below. In some embodiments, the method 600 is performed by the navigation computer 108.

After start operation 605, method 600 moves to operation 610, which generates, based on measurements from a plurality of navigation sensors, a plurality of navigation parameters. In some embodiments, the navigation sensors include one or more of a master filter (e.g. $s_1$), a signal of opportunity (SOP) (e.g. Starlink) (e.g. $s_2$), a Military GPS User Equipment (MGUE) (e.g. $s_3$), an International non-encrypted GPS (FAA) (e.g. $s_4$), an Inertial Measurement Unit (IMU) (e.g. $s_5$), a Magnetometer NAV aid (MAN) (e.g. $s_6$), an air data system (ADS) (e.g. $s_7$), or an altimeter Nav Aid (AAN) (e.g. $s_8$).

In some embodiments, the plurality of navigation parameters include one or more of a position parameter, heading parameter, attitude parameter, time parameter, or velocity parameter. In some embodiments, one or more of the plurality of navigation parameters are generated based on input from two or more navigation sensors. For example, a position is determined, in some embodiments, based on input from an inertial measurement unit and a time sensor, such as a clock. In some embodiments, the position is further based on a star tracker. For example, as illustrated above with respect to FIG. 4, each of the navigation sensors 402*a-c* generate measurements that are used to determine one or more of the navigation parameters 404*a-b*.

In operation 620, each of the navigation parameters are provided to a separate local Kalman filter. For example, as discussed above with respect to FIG. 4, each of the navigation parameters 404*a* are provided to the filters 406*a-b* respectively.

In operation 630, covariances of outputs of each of the Kalman filters are determined. As discussed above with respect to FIG. 4, covariances 408*a-b* are determined from outputs 407*a-b* of the filters 406*a-b* respectively. In some embodiments, each of the covariances is represented by a covariance matrix.

In operation 640, a master filter is updated based on the plurality of navigation parameters. In some embodiments, each of the covariances determined in operation 630 is supplied to the master filter. In some embodiments, the master filter determines a pooled master covariance according to the following Equation:

$$\text{Pooled Master Covariance: } P_m = [P_0^{-1} + P_1^{-1} + P_2^{-1} + P_3^{-1} + P_4^{-1}]^{-1} \quad (4)$$

where:

$P_n$ a covariance of a local Karman Filter as determined in operation 630.

In operation 650, corruption of at least one of the local Kalman filters is determined (e.g. any of 406*a* or 406*b* in the illustrated embodiment of FIG. 4). In some embodiments, the determination of corruption is based on an output of the master filter. In some embodiments, the output of the master filter is compared to a predefined threshold, with the determination of corruption based on the comparison. For example, if the output of the master filter is above or below the threshold, the master filter is considered corrupt. In some embodiments, the master filter output is determined according to Equation 5 below:

$$\text{Master Filter Output: } \hat{X} = P_m[P_0^{-1}\hat{x}_0 + P_1^{-1}\hat{x}_1 + P_2^{-1}\hat{x}_2 + P_3^{-1}\hat{x}_3 + P_4^{-1}\hat{x}_4], \quad (5)$$

where:

$\hat{x}_j$=a bias of the respective local Kalman filter

In operation 660, a probability that each of the sensors is degraded is determined. Thus, a plurality of probabilities is determined by operation 660, with each of the probabilities included in the plurality of probabilities indicating whether a different navigation sensor is degraded.

In some embodiments, the probability of a particular sensor being degraded is based on output of a local Kalman filter that received a navigation parameter that is based on the particular sensor. In some embodiments, the output of the local Kalman filter is normalized by the pooled master covariance discussed above with respect to operation 640. In some embodiments, performance of operation 660 is in response to the determination of corruption in operation 650. In some embodiments, a probability that each of the sensors is degraded is based on Equation 6 below:

$$B_n = P_m P_n^{-1} \quad (6)$$

where:

$B_n$ a belief or probability that a particular navigation sensor is degraded, $P_m$ a pooled master covariance, Pn a covariance of a local Karman Filter as determined in operation 630.

Some embodiments implement a truth table to determine a probability of degradation of a navigation sensor. For example, in some embodiments, the truth tables maps one or more covariances of navigation parameters that depend on a navigation sensor, to a probability that the navigation sensor is degraded.

Some other embodiments implement a machine learning model to determine probabilities of degradation of each of the plurality of navigation sensors. In these embodiments, the covariances of the navigation parameters' Kalman filter outputs are provided, as features, to the model. The model is trained, in these embodiments, based on covariances of Kalman filter outputs with label data indicating which of the navigation sensors are degraded. The model is then able to infer each navigation sensor's probability of degradation when provided with covariance information derived from navigation parameters. One example of a model that is configured to determine probabilities of degradation is discussed below with respect to FIG. 7.

Some embodiments normalize the probabilities of degradation based on a sum of the probabilities. Thus, for example, as discussed above with respect to FIG. 4, in an example embodiment including two navigation sensors and three navigation parameters, first and second probabilities that each of the two navigation sensors are degraded are normalized by a sum of the first and second probabilities.

In operation 670, the probabilities determined in operation 660 are mapped to an action. In some embodiments, a belief is determined based on the distribution of probabilities over sensor degradation states as determined in operation 660. The belief is then mapped to an action in these embodiments.

The mapping is performed based on a Policy. The Policy is generated by a POMDP, such as the POMDP discussed above with respect to FIG. 5. The action that is mapped from the belief by the Policy, indicates which, if any, of the navigation sensors are degraded. In some embodiments, a degraded sensor is then ignored or discounted in a vehicle navigation process.

Some embodiments selectively inhibit consideration of output of a sensor deemed to be in a degraded state by the policy. Some embodiments control a machine, such as an airplane, drone, missile, or other vehicle based on the plurality of sensors, but selectively ignore or inhibit consideration of a sensor determined to be in a degraded state by the policy.

Figure 7:
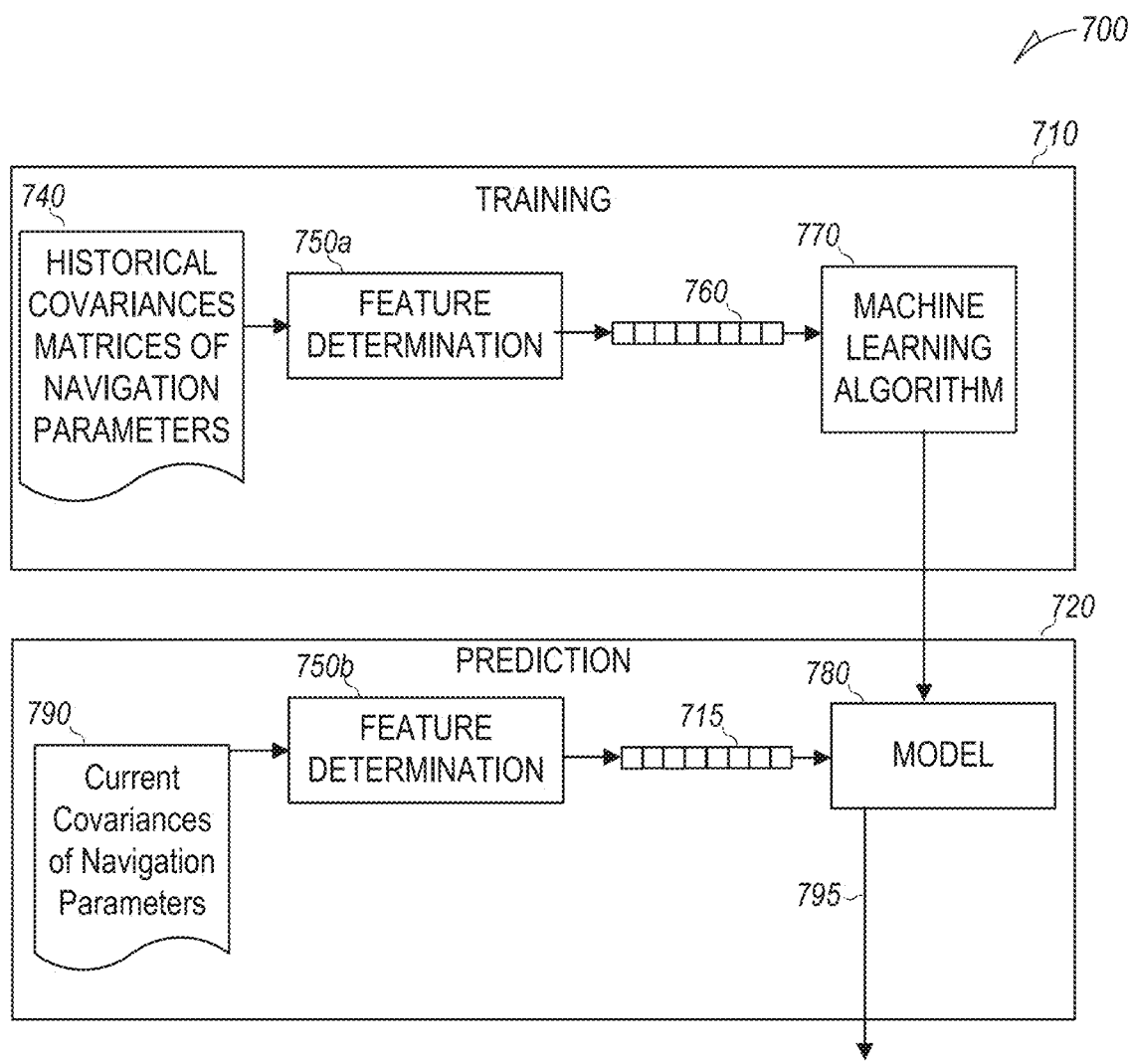
FIG. 7 shows an example machine learning module according to some examples of the present disclosure.

FIG. 7 shows an example machine learning module 700 according to some examples of the present disclosure. In some embodiments, the navigation computer 108 implements at least a portion of the machine learning module 700. In some embodiments, the machine learning module 700 is used to perform one or more of the functions discussed above with respect to operation 660 of FIG. 6.

Machine learning module 700 utilizes a training module 710 and a prediction module 720. In some embodiments, the training module 710 inputs historical covariance matrices of navigation parameter values 740 into feature determination module 750a. The historical covariance matrices of navigation parameter values 740 are labeled in some embodiments. The historical covariance matrices of navigation parameter values 740 are labeled to indicate whether the covariance matrices are derived from a degraded navigation sensor. In some embodiments, if a covariance matrix is derived from measurements from multiple navigation sensors, the label indicates which of the multiple navigation sensors is degraded.

Feature determination module 750a determines one or more of the features 760 from the historical covariance matrixes of navigation parameter values 740. Stated generally, the features 760 are a set of the information input and is information determined to be predictive of a particular outcome. In some examples, the features 760 are based on outputs of discrete Kalman filters of the historical covariance matrices of navigation parameter values 740, and/or covariance matrices that are derived from those outputs. The machine learning algorithm 770 produces a model 780 based upon the features 760 and the label(s).

In the prediction module 720, online or measured covariance matrices of navigation parameter values 790 for are input to the feature determination module 750b. In some embodiments, the feature determination module 750b determines the same set of features or a different set of features from the online or measured covariance matrices derived from navigation parameter values 790 as feature determination module 750a determined from the historical covariance matrices derived from covariance matrices of navigation parameter values 740. In some examples, feature determination module 750a and 750b are the same module. Feature determination module 750b produces features 715, which is input into the model 780 to generate a distribution of probabilities that each of the navigation sensors is degraded 795. In some embodiments, the distribution of probabilities 795 is analogous to the belief vector 414, discussed above with respect to FIG. 4.

In some embodiments, the distribution of probabilities 795 indicates the likelihood of degradation among a plurality of sensors. As discussed above, covariances of navigation parameters (e.g. 790) are generated based on output from a plurality of navigation parameters. Each of the navigation parameters is based on one or more plurality of navigation sensors. The training module 710 may operate in an offline manner to train the model 780. The prediction module 720, however, may be designed to operate in an online manner. It should be noted that the model 780 may be periodically updated via additional training and/or user feedback. As discussed above, in some embodiments, the distribution of probabilities are used to determine a belief, which is then mapped, by a POMDP policy, to an action. The action decides which of the navigation sensors are discounted or otherwise not used to generate the navigation parameter values (e.g. 790).

The machine learning algorithm 770 may be selected from among many different potential supervised or unsupervised machine learning algorithms. In an example embodiment, a regression model is used and the model 780 is a vector of coefficients corresponding to a learned importance for each of the features 760, and/or features 715. In some embodiments, one or more of the features 760 and/or features 715 are represented as feature vectors. In these embodiments, a score is calculated via a dot product of the vector. In some embodiments, a vector of coefficients of the model 780 is taken in some embodiments.

In some aspects, one or more of the training module 710 and/or prediction module 720 may execute on hardware processing circuitry, such as the processor 802 discussed below with respect to FIG. 8.

Figure 8:
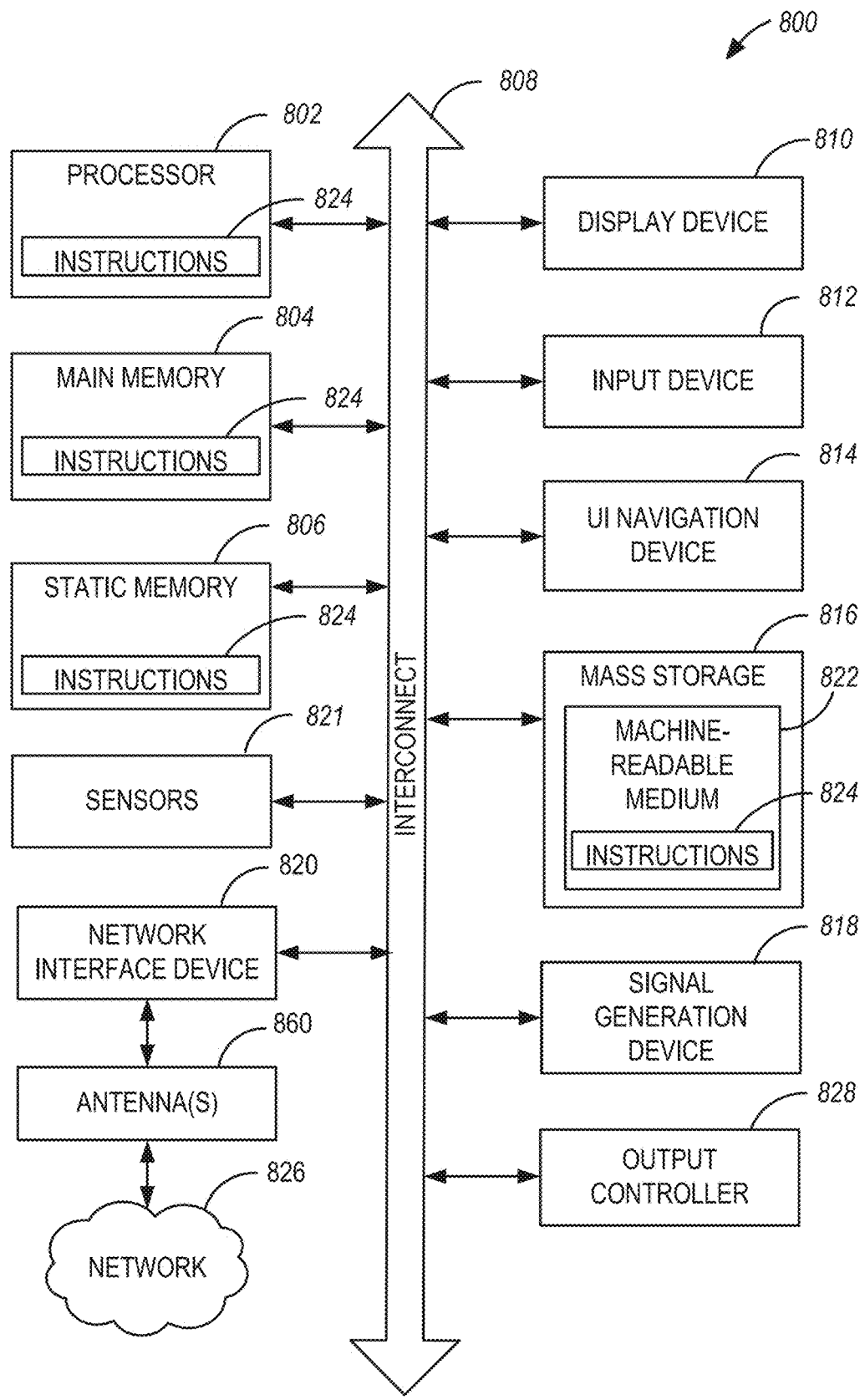
FIG. 8 illustrates a block diagram of an example machine upon which any one or more of the techniques (e.g., methodologies) discussed herein may perform.

FIG. 8 illustrates a block diagram of an example machine 800 upon which any one or more of the techniques (e.g., methodologies) discussed herein may perform. Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. In some embodiments, the example machine 800 is implemented by the navigation computer 108. In some embodiments, the method 500 and/or 600 is performed by the example machine 800.

Specific examples of main memory 804 include Random Access Memory (RAM), and semiconductor memory devices, which may include, in some embodiments, storage locations in semiconductors such as registers. Specific examples of static memory 806 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 800 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 822 is illustrated as a single medium, the term "machine readable medium" may include a single medium or multiple media (e.g., a centralized or distributed database, and/or associated caches and servers) configured to store the one or more instructions 824.

An apparatus of the machine 800 may be one or more of a hardware processor 802 (e.g., a central processing unit (CPU), a graphics processing unit (GPU), a hardware processor core, or any combination thereof), a main memory 804 and a static memory 806, sensors 821, network interface device 820, antennas 860, a display device 810, an input device 812, a UI navigation device 814, a mass storage 816, instructions 824, a signal generation device 818, and an output controller 828. The apparatus may be configured to perform one or more of the methods and/or operations disclosed herein. The apparatus may be intended as a component of the machine 800 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices, magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 800, and includes digital or analog communications signals or other intangible medium to facilitate communication of such software.

Examples, as described herein, may include, or may operate on, logic or a number of components, modules, or mechanisms. Modules are tangible entities (e.g., hardware)

capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Example 1 is a navigation apparatus configured for operation in a GPS-denied Alternative Position, Navigation, and Time (PNT) environment, the apparatus comprising: processing circuitry; and memory, wherein the processing circuitry is configured to: generate a plurality of navigation parameter values based on measurements from a plurality of navigation sensors, at least one of the navigation parameter values based on measurements from at least two of the plurality of navigation sensors; provide each of the plurality of navigation parameter values to a corresponding local Kalman filter; determine covariances of first outputs from each of the Kalman filters; update a master filter based on the plurality of navigation parameters, the master filter configured to normalize each of the Kalman filter first outputs by a pooled covariance, and to determine an output of the master filter update based on the normalized first outputs; determine at least one of the local Kalman filters is corrupted based on the output of the master filter update; and in response to the determination of the corruption; determine, based on the plurality of navigation parameter values, a distribution of degradation probability over the plurality of navigation sensors, and map, based on a policy derived from a partially observable markov decision process, the distribution of degradation probability to an action, the action indicating which of the plurality of navigation sensors is degraded.

In Example 2, the subject matter of Example 1 optionally includes wherein the processing circuitry is further configured to generate a second plurality of navigation parameter values based on which of the plurality of sensors are degraded.

In Example 3, the subject matter of any one or more of Examples 1-2 optionally include wherein the processing circuitry is further configured to control a machine based on the action.

In Example 4, the subject matter of any one or more of Examples 2-3 optionally include wherein the processing circuitry is further configured to iteratively generate the navigation parameter values, and iteratively provide each of the iteratively generated navigation parameter values to its corresponding local Kalman filter.

In Example 5, the subject matter of any one or more of Examples 1-4 optionally include wherein the determination of corrupted local Kalman filter comprises comparing the pooled master covariance to a predefined threshold.

In Example 6, the subject matter of Example 5 optionally includes wherein the determination of at least one corrupted local Kalman filter comprises determining a bias of each of the first outputs, wherein the determination is based on the determined biases.

In Example 7, the subject matter of any one or more of Examples 1-6 optionally include wherein the plurality of navigation parameters include a velocity parameter, position parameter, attitude parameter, time parameter, and a heading parameter.

In Example 8, the subject matter of any one or more of Examples 1-7 optionally include wherein the plurality of navigation sensors include two or more of a military global positioning system (GPS) user equipment (MGUE), an international non-encrypted GPS, an inertial measurement unit, magnetometer navigation aid (MAN), an air data system (ADS), or an altimeter navigation aid (AAN).

Example 9 is a method of navigation in a GPS-denied Alternative Position, Navigation, and Time (PNT) environment, the method comprising: generating a plurality of navigation parameter values based on measurements from a plurality of navigation sensors, at least one of the navigation parameter values based on measurements from at least two of the plurality of navigation sensors; providing each of the plurality of navigation parameter values to a corresponding local Kalman filter; determining covariances of first outputs from each of the Kalman filters; updating a master filter based on the plurality of navigation parameters, the master filter configured to normalize each of the Kalman filter first outputs by a pooled covariance, and to determine an output of the master filter update based on the normalized first outputs; determining at least one of the local Kalman filters is corrupted based on the output of the master filter update; and in response to the determination of the corruption: determining, based on the plurality of navigation parameter values, a distribution of degradation probability over the plurality of navigation sensors, and mapping, based on a policy derived from a partially observable markov decision process, the distribution of degradation probability to an action, the action indicating which of the plurality of navigation sensors is degraded.

In Example 10, the subject matter of Example 9 optionally includes generating a second plurality of navigation parameter values based on which of the plurality of sensors are degraded.

In Example 11, the subject matter of any one or more of Examples 9-10 optionally include controlling a machine based on the action.

In Example 12, the subject matter of any one or more of Examples 10-11 optionally include iteratively generating the navigation parameter values, and iteratively providing each of the iteratively generated navigation parameter values to its corresponding local Kalman filter.

In Example 13, the subject matter of any one or more of Examples 9-12 optionally include wherein the determination of corrupted local Kalman filter comprises comparing the pooled master covariance to a predefined threshold.

In Example 14, the subject matter of Example 13 optionally includes wherein the determination of at least one corrupted local Kalman filter comprises determining a bias of each of the first outputs, wherein the determination is based on the determined biases.

In Example 15, the subject matter of any one or more of Examples 9-14 optionally include wherein the plurality of navigation parameters include a velocity parameter, position parameter, attitude parameter, time parameter, and a heading parameter.

In Example 16, the subject matter of any one or more of Examples 9-15 optionally include wherein the plurality of navigation sensors include two or more of a military global positioning system (GPS) user equipment (MGUE), an international non-encrypted GPS, an inertial measurement unit, magnetometer navigation aid (MAN), an air data system (ADS), or an altimeter navigation aid (AAN).

Example 17 is a non-transitory computer readable storage medium comprising instructions that when executed configure hardware processing circuitry to perform operations for navigation in a GPS-denied Alternative Position, Navigation, and Time (PNT) environment, the operations comprising: generating a plurality of navigation parameter values based on measurements from a plurality of navigation sensors, at least one of the navigation parameter values based on measurements from at least two of the plurality of navigation sensors; providing each of the plurality of navigation parameter values to a corresponding local Kalman filter; determining covariances of first outputs from each of the Kalman filters; updating a master filter based on the plurality of navigation parameters, the master filter configured to normalize each of the Kalman filter first outputs by a pooled covariance, and to determine an output of the master filter update based on the normalized first outputs; determining at least one of the local Kalman filters is corrupted based on the output of the master filter update; and in response to the determination of the corruption: determining, based on the plurality of navigation parameter values, a distribution of degradation probability over the plurality of navigation sensors, and mapping, based on a Policy derived from a partially observable Markov decision process, the distribution of degradation probability to an action, the action indicating which of the plurality of navigation sensors is degraded.

In Example 18, the subject matter of Example 17 optionally includes the operation further comprising generating a second plurality of navigation parameter values based on which of the plurality of sensors are degraded.

In Example 19, the subject matter of any one or more of Examples 17-18 optionally include the operations further comprising controlling a machine based on the action.

In Example 20, the subject matter of any one or more of Examples 18-19 optionally include the operations further comprising iteratively generating the navigation parameter values, and iteratively providing each of the iteratively generated navigation parameter values to its corresponding local Kalman filter.

In Example 21, the subject matter of any one or more of Examples 17-20 optionally include wherein the determination of corrupted local Kalman filter comprises comparing the pooled master covariance to a predefined threshold.

In Example 22, the subject matter of Example 21 optionally includes wherein the determination of at least one corrupted local Kalman filter comprises determining a bias of each of the first outputs, wherein the determination is based on the determined biases.

In Example 23, the subject matter of any one or more of Examples 17-22 optionally include wherein the plurality of navigation parameters include a velocity parameter, position parameter, attitude parameter, time parameter, and a heading parameter.

In Example 24, the subject matter of any one or more of Examples 17-23 optionally include wherein the plurality of navigation sensors include two or more of a military global positioning system (GPS) user equipment (MGUE), an international non-encrypted GPS, an inertial measurement unit, magnetometer navigation aid (MAN), an air data system (ADS), or an altimeter navigation aid (AAN).

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

What is claimed is:

1. A navigation apparatus configured for operation in a GPS-denied Alternative Position, Navigation, and Time (PNT) environment, the apparatus comprising:
processing circuitry; and memory, wherein the processing circuitry is configured to:
receive, from a plurality of navigation sensors, sensor measurements;
generate a plurality of navigation parameter values based on the sensor measurements, at least one of the navigation parameter values based on measurements from at least two of the plurality of navigation sensors;
provide each of the plurality of navigation parameter values to respective local Kalman filters situated in parallel to each other;
determine covariances based on first outputs from each of the Kalman filters;
determining, based on the determined covariances, a pooled covariance;
normalize, by a master filter and based on the plurality of navigation parameter values, each of the Kalman filter first outputs by the pooled covariance;
determine an output of the master filter based on the normalized first outputs and the pooled covariance;
determine at least one of the local Kalman filters is corrupted based on the output of the master filter being greater than a specified threshold value; and
in response to the determination of the corruption:
determine, based on the plurality of navigation parameter values, a distribution of degradation probability over the plurality of navigation sensors,
map, based on a Policy derived from a partially observable Markov decision process that operates based on the navigation parameter values and the covariances, the distribution of degradation probability to an action, the action indicating which of the plurality of navigation sensors is degraded, and
cause a vehicle to move based on a second plurality of navigation parameter values, the second plurality of navigation parameter values determined based on the measurement values from the plurality of navigation sensors that are not degraded and not determined based on the measurement from the plurality of navigation sensors that are degraded.

2. The navigation apparatus of claim 1, wherein the processing circuitry is further configured to control a machine based on the action.

3. The navigation apparatus of claim 1, wherein the processing circuitry is further configured to iteratively generate the navigation parameter values, and iteratively provide each of the iteratively generated navigation parameter values to its corresponding local Kalman filter.

4. The navigation apparatus of claim 1, wherein the determination of corrupted local Kalman filter comprises comparing the pooled master covariance to a predefined threshold.

5. The navigation apparatus of claim 4, wherein the determination of at least one corrupted local Kalman filter comprises determining a bias of each of the first outputs, wherein the determination of the pooled master covariance is based on the determined biases.

6. The navigation apparatus of claim 1, wherein the plurality of navigation parameters include a velocity parameter, position parameter, attitude parameter, time parameter, and a heading parameter.

7. The navigation apparatus of claim 1, wherein the plurality of navigation sensors include two or more of a military global positioning system (GPS) user equipment (MGUE), an international non-encrypted GPS, an inertial measurement unit, magnetometer navigation aid (MAN), an air data system (ADS), or an altimeter navigation aid (AAN).

8. A method of navigation by a navigation apparatus in a GPS-denied Alternative Position, Navigation, and Time (PNT) environment, the method comprising:
receiving, from a plurality of navigation sensors, sensor measurements;
generating a plurality of navigation parameter values based on the sensor measurements, at least one of the navigation parameter values based on measurements from at least two of the plurality of navigation sensors;
providing each of the plurality of navigation parameter values to respective local Kalman filters situated in parallel to each other;
determining covariances based on first outputs from each of the Kalman filters;
determining, based on the determined covariances, a pooled covariance;
normalizing, by a master filter and based on the plurality of navigation parameters, each of the Kalman filter first outputs by the pooled covariance;
determining an output of the master filter based on the normalized first outputs and the pooled covariance;
determining at least one of the local Kalman filters is corrupted based on the output of the master filter being greater than a specified threshold value; and
in response to the determination of the corruption:
determining, based on the plurality of navigation parameter values, a distribution of degradation probability over the plurality of navigation sensors,
mapping, based on a Policy derived from a partially observable Markov decision process that operates based on the navigation parameter values and the covariances, the distribution of degradation probability to an action, the action indicating which of the plurality of navigation sensors is degraded, and
causing a vehicle to move based on a second plurality of navigation parameter values, the second plurality of navigation parameter values determined based on the measurement values from the plurality of navigation sensors that are not degraded.

9. The method of claim 8, further comprising controlling a machine based on the action.

10. The method of claim 8, further comprising iteratively generating the navigation parameter values, and iteratively providing each of the iteratively generated navigation parameter values to its corresponding local Kalman filter.

11. The method of claim 8, wherein the determination of corrupted local Kalman filter comprises comparing the pooled master covariance to a predefined threshold.

12. The method of claim 11, wherein the determination of at least one corrupted local Kalman filter comprises determining a bias of each of the first outputs, wherein the determination of the pooled master covariance is based on the determined biases.

13. The method of claim 8, wherein the plurality of navigation parameters include a velocity parameter, position parameter, attitude parameter, time parameter, and a heading parameter.

14. The method of claim 8, wherein the plurality of navigation sensors include two or more of a military global positioning system (GPS) user equipment (MGUE), an international non-encrypted GPS, an inertial measurement unit, magnetometer navigation aid (MAN), an air data system (ADS), or an altimeter navigation aid (AAN).

15. A non-transitory computer readable storage medium comprising instructions that when executed configure hardware processing circuitry to perform operations for navigation in a GPS-denied Alternative Position, Navigation, and Time (PNT) environment, the operations comprising:
   receiving, from a plurality of navigation sensors, sensor measurements;
   generating a plurality of navigation parameter values based on the sensor measurements, at least one of the navigation parameter values based on measurements from at least two of the plurality of navigation sensors;
   providing each of the plurality of navigation parameter values to a respective local Kalman filters situated in parallel to each other;
   determining covariances based on first outputs from each of the Kalman filters;
   determining, based on the determined covariances, a pooled covariance;
   normalizing, by a master filter and based on the plurality of navigation parameters, each of the Kalman filter first outputs by the pooled covariance;
   determining an output of the master filter based on the normalized first outputs and the pooled covariance;
   determining at least one of the local Kalman filters is corrupted based on the output of the master filter being greater than a specified threshold value; and
   in response to the determination of the corruption:
      determining, based on the plurality of navigation parameter values, a distribution of degradation probability over the plurality of navigation sensors being greater than a specified threshold value,
      mapping, based on a Policy derived from a partially observable Markov decision process that operates based on the navigation parameter values and the covariances, the distribution of degradation probability to an action, the action indicating which of the plurality of navigation sensors is degraded, and
      cause a vehicle to move based on a second plurality of navigation parameter values, the second plurality of navigation parameter values determined based on the measurement values from the plurality of navigation sensors that are not degraded.

16. The non-transitory computer readable storage medium of claim 15, the operations further comprising controlling a machine based on the action.

17. The non-transitory computer readable storage medium of claim 15, the operations further comprising iteratively generating the navigation parameter values, and iteratively providing each of the iteratively generated navigation parameter values to its corresponding local Kalman filter.

* * * * *